(12) United States Patent
Zamora et al.

(10) Patent No.: US 6,194,664 B1
(45) Date of Patent: Feb. 27, 2001

(54) APPARATUS FOR ISOLATING AND REINFORCING BEND CORNERS OF FLEXIBLE CABLE

(75) Inventors: George G. Zamora, Vail; Robert Lamont Watson; Kenneth Robert Dust, both of Tucson, all of AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/327,114

(22) Filed: Jun. 7, 1999

(51) Int. Cl.⁷ .................................................... H01B 7/08

(52) U.S. Cl. .......................................... 174/117 F; 248/51

(58) Field of Search ................................ 174/117 F, 72 A, 174/135; 248/49, 51, 53, 60, 74.2, 74.1

(56) References Cited

U.S. PATENT DOCUMENTS

| | | | |
|---|---|---|---|
| 4,898,351 | * 2/1990 | Suzuki et al. | 248/51 |
| 5,016,841 | * 5/1991 | Schumann et al. | 248/51 |
| 5,175,398 | 12/1992 | Hofmann | 174/169 |
| 5,433,631 | 7/1995 | Beaman et al. | 439/493 |
| 5,482,473 | 1/1996 | Lord et al. | 439/67 |
| 5,669,749 | 9/1997 | Danielson et al. | 414/280 |
| 5,687,479 | * 11/1997 | Bennin et al. | 29/885 |
| 5,764,839 | 6/1998 | Igl et al. | 385/114 |
| 6,029,437 | * 2/2000 | Hart | 248/49 X |

* cited by examiner

Primary Examiner—Kristine Kincaid
Assistant Examiner—Chau N. Nguyen
(74) Attorney, Agent, or Firm—Robert M. Sullivan; Felsman, Bradley, Vaden, Gunter & Dillon, LLP

(57) ABSTRACT

An apparatus for reinforcing a flexible cable has a series of alternating rigid and flexible segments that are fastened together to form a continuous support unit along most of the length of the cable. The rigid segments are preferably formed from stiff plastic while the flexible segments are formed from elastomeric material. The rigid segments typically have an elongated strip on one side of the cable, and a pair of front and rear, elongated tabs on the opposite side for clamping onto the cable. The strips and tabs have inner channels for accommodating the thickness of the cable between them. The flexible segments are soft but resilient sheet-like members that act as support hinges for the bend radii of the cable. Fasteners used to join the segments together. The cable is flexed at predefined flex points which are located adjacent to the flexible segments. The flex points do not move and are isolated between the fastened ends of the flexible segments. The ends of the cable are interconnected with the stationary and dynamic portions of an automated device. The dynamic portion moves relative to the stationary portion between extended and retracted positions. In the extended position, the flexible segments open to their maximum bend radii with the rigid segments staggered diagonally between them. In the retracted position, the flexible segments are collapsed to their minimum bend radii and the rigid segments are stacked flat against one another. With the apparatus, the bend radii of the cable are larger than they would normally be at all times due to the presence of the flexible segments, thereby minimizing the bending stresses on the cable.

29 Claims, 5 Drawing Sheets

APPARATUS FOR ISOLATING AND REINFORCING BEND CORNERS OF FLEXIBLE CABLE

BACKGROUND OF THE INVENTION

1. Technical Field

This invention relates in general to flexible cables and in particular to devices for isolating and reinforcing a flexible cable having set bend corners or hinge areas.

2. Background Art

Devices which require the use of flexible cables such as flat ribbon cable are well known in the art. These devices typically have a stationary element and a dynamic element which moves relative to the stationary element between extended and retracted positions. Flexible cables are needed to provide input/output signals and/or power signals by extending between and interconnecting the two elements. Since the extended position is further away from the stationary portion than the retracted position, the flexible cable must be provided with enough cable length to reach both positions. Thus, when the dynamic portion is in the retracted position, the excess cable length must be accommodated. This is typically accomplished by bending or folding the cable along at least one bend radius.

However, as the dynamic element is repeatedly cycled between the extended and retracted positions, the flexible cable undergoes incessant flexure. The flexible cable experiences bending stresses at its bend radii and will eventually fatigue over time. The process is accelerated if the flexible cable is creased, or if the bend radii are limited to specific portions of the cable.

One type of prior art device, disclosed in U.S. Pat. No. 5,669,749, describes a movable, flexible ribbon cable with a support band assembly. In this device, the dynamic element flexes or bends the cable throughout its length. Thus, although this is a dynamic application, the hinge region of the cable is in continuous motion as the dynamic element of the device moves between the extended and retracted positions. The hinge region is not isolated or fixed as described above.

In U.S. Pat. No. 5,175,398, another type of prior art device uses a cable that is interconnected between a keyboard and the CPU. The cable has predefined hinge regions which are isolated by shrink tubing or the like to minimize the stresses exerted at the bend radii of the cable. Although this design is workable, it is a noncontinuous application which is generally not expected to exceed 50,000 flex cycles. In contrast, applications involving automated moving elements may require a cable to endure more than one million flex cycles. Moreover, the shrink tubing places a discontinuity on the hinge regions which causes higher stress concentrations.

Therefore, it is a feature of the present invention to provide an apparatus for isolating and reinforcing a flexible cable having set or predefined hinge regions.

It is another feature of the present invention to provide such an apparatus for extending the flex life of the cable while minimizing the bend radii of the hinge regions.

SUMMARY OF THE INVENTION

An apparatus for reinforcing a flexible cable has a series of alternating rigid and flexible segments that are fastened together to form a continuous support unit along most of the length of the cable. The rigid segments are preferably formed from stiff plastic while the flexible segments are formed from elastomeric material. The rigid segments typically have an elongated strip on one side of the cable, and a pair of front and rear, elongated tabs on the opposite side for clamping onto the cable. The strips and tabs have inner channels for accommodating the thickness of the cable between them. The flexible segments are soft but resilient sheet-like members that act as support hinges for the bend radii of the cable. Fasteners used to join the segments together.

The cable is flexed at predefined flex points which are located adjacent to the flexible segments. The flex points do not move and are isolated between the fastened ends of the flexible segments. The ends of the cable are interconnected with the stationary and dynamic portions of an automated device. The dynamic portion moves relative to the stationary portion between extended and retracted positions. In the extended position, the flexible segments open to their maximum bend radii with the rigid segments staggered diagonally between them. In the retracted position, the flexible segments are collapsed to their minimum bend radii and the rigid segments are stacked flat against one another. With the apparatus, the bend radii of the cable are larger than they would normally be at all times due to the presence of the flexible segments, thereby minimizing the bending stresses on the cable.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
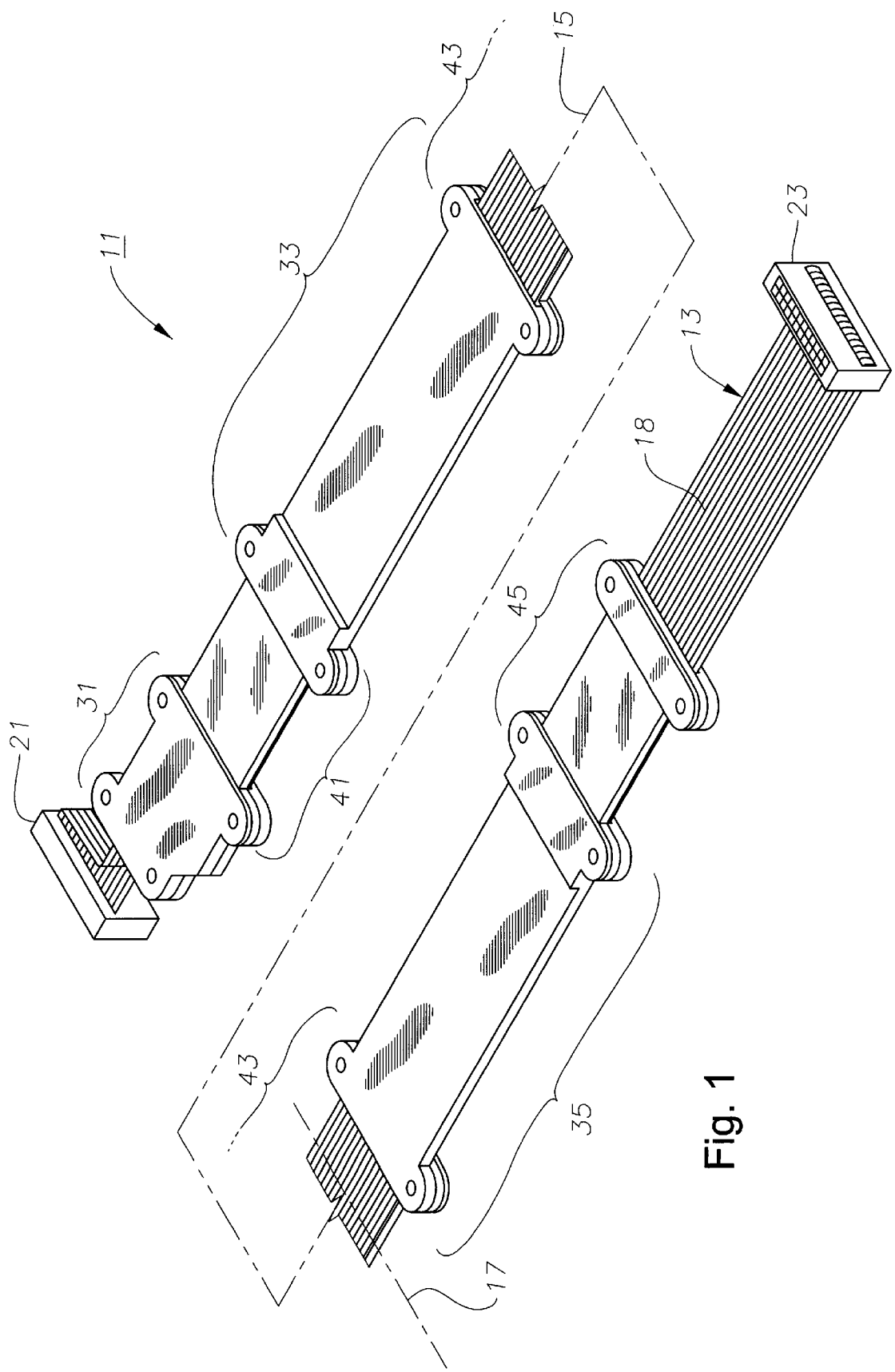
FIG. 1 is an isometric view of a first embodiment of an apparatus constructed in accordance with the invention.
Figure 2A:
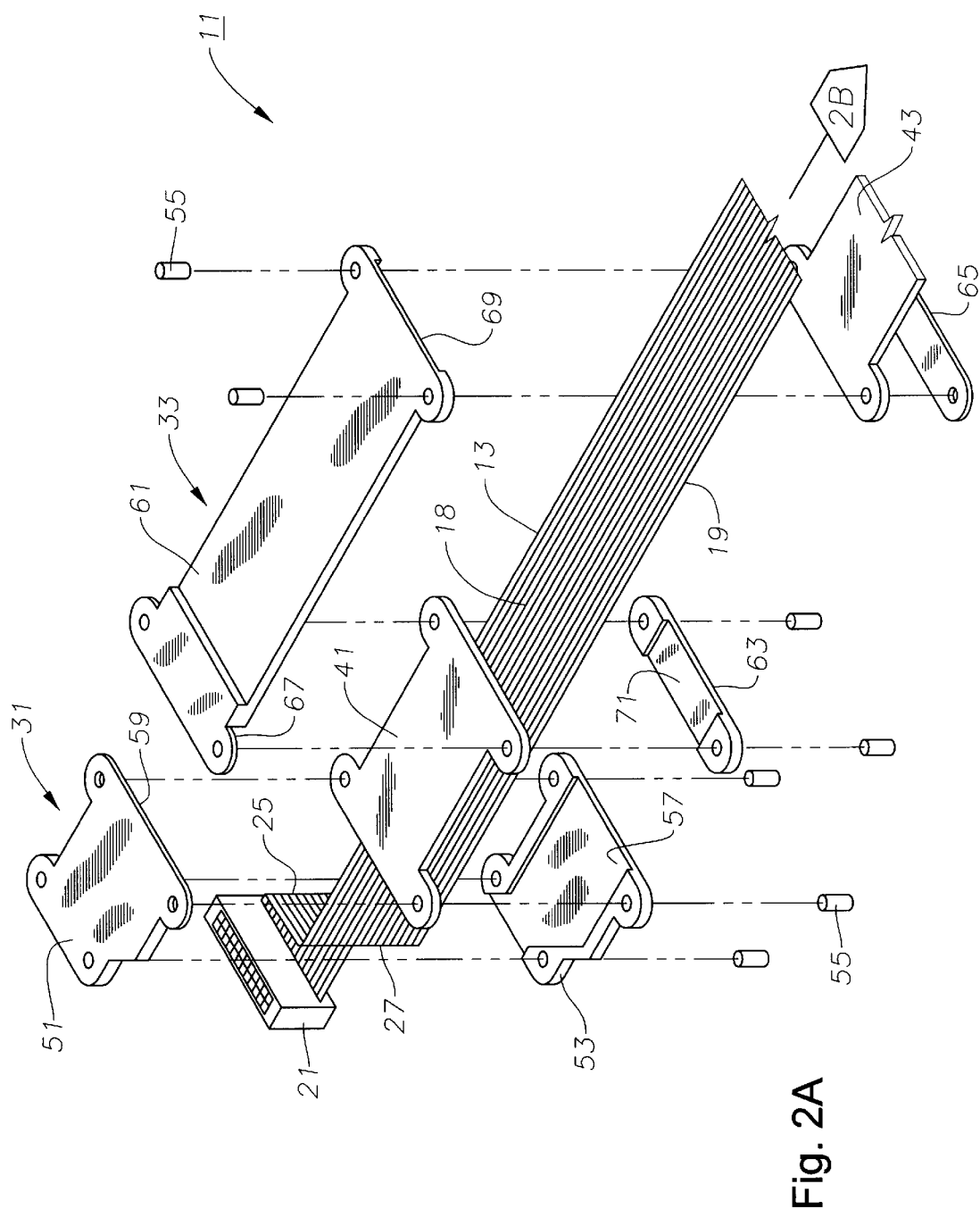
FIGS. 2A and 2B are exploded, split isometric views of the apparatus of FIG. 1.
Figure 2B:
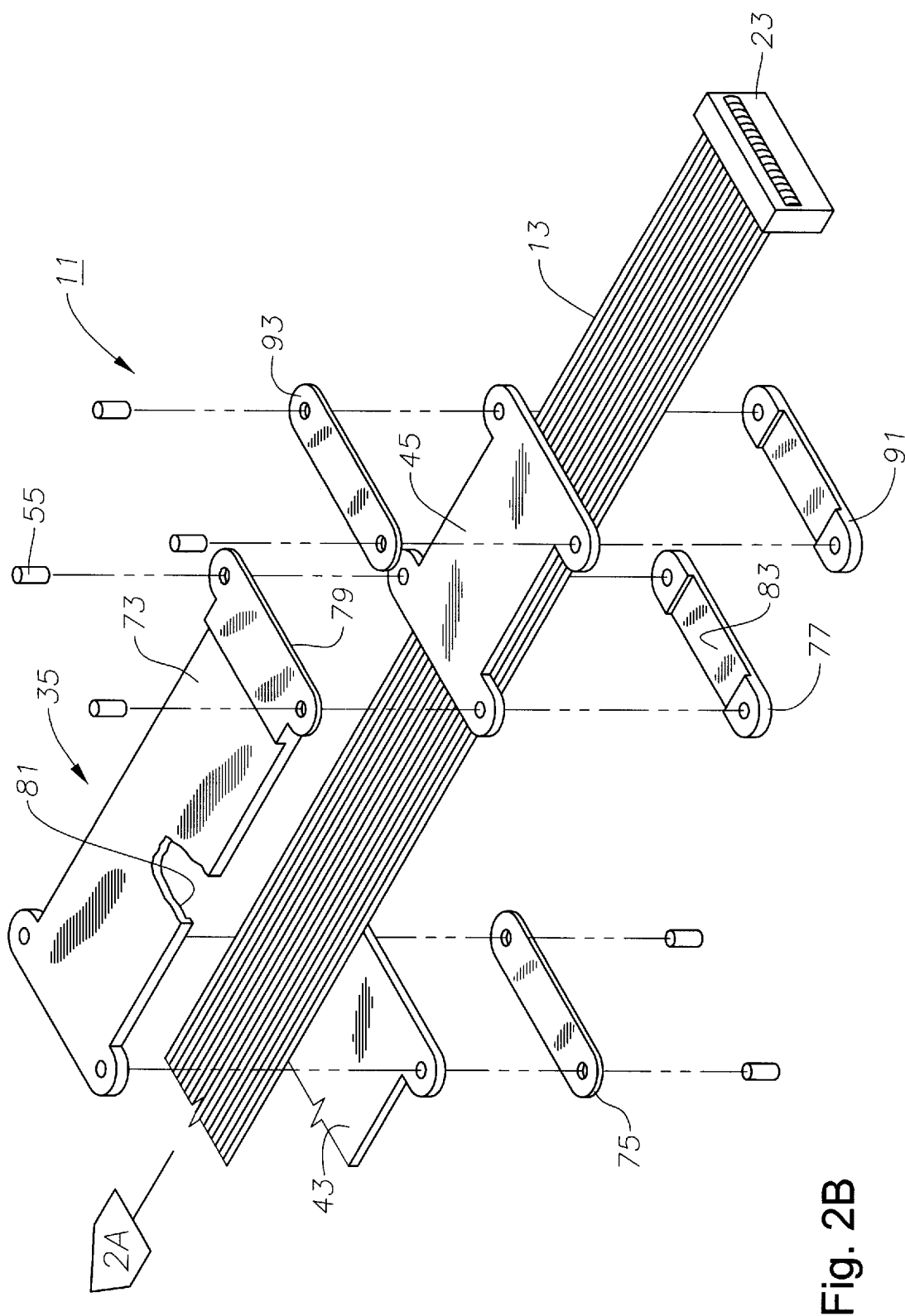

Referring to FIGS. 1, 2A and 2B, an apparatus 11 for supporting and reinforcing a flexible cable 13 is shown. Although cable 13 is shown as an approximately two foot length of conventional flat ribbon cable having a plurality of insulated, parallel, electrically conductive leads, it should be apparent that apparatus 11 may be adapted for other types flexible cables as well. Cable 13 has a longitudinal axis 15, a lateral axis 17 which is perpendicular to axis 15, an upper surface 18 and a lower surface 19. Each end of cable 13 is terminated in a connector 21, 23. In the embodiment shown, a portion of cable 13 near connector 21 has been folded twice along fold lines 25, 27 (FIG. 2A) for a particular application that will be described below. Fold lines 25, 27 are diagonal relative to axes 15, 17 and allow connector 21 to be laterally offset from connector 23 by about one inch.

Apparatus 11 comprises a plurality of segments that are fastened together to form a continuous support unit along most of the length of cable 13. In the embodiment of FIGS. 1 and 2, apparatus 11 has three rigid segments 31, 33, 35, and three flexible segments 41, 43, 45. However, it should be apparent that apparatus 11 may comprise more or fewer of either type of segment, depending upon the application it is designed for.

The components of rigid segments 31, 33, 35 are preferably formed from a stiff plastic such as polycarbonate. The components of flexible segments 41, 43, 45 are preferably formed from a sheet of elastomeric material such as silicone rubber. Rigid segments 33, 35 are identical to one another but differ significantly from rigid segment 31. Flexible segments 41, 43, 45 are identical to one another, but are located on alternating surfaces of cable 13.

As shown in FIG. 2A, rigid segment 31 comprises a pair of matched plates 51, 53. Plates 51, 53 are generally flat, polygonal members that sandwich cable 13 at fold lines 25, 27. Plates 51, 53 are joined together by a fastener 55 on each of their four protruding corners. Note that fasteners 55 extend through plates 51, 53 beyond the lateral side edges of cable 13. Fasteners 55 may comprise screws, rivets, or the like and may be located in countersunk holes in rigid segment 31. Plates 51, 53 are approximately the same thickness, but plate 53 has a contoured channel 57 in its upper surface for accommodating the thickness of cable 13. Plate 51 has a consistent thickness except for the lower surface of its rearward end where a rectangular notch 59 is provided for accommodating the front end of flexible segment 41 between it and cable 13. Flexible segment 41 is a soft but resilient, generally I-shaped member that acts as a support hinge for the portion of cable 13 adjacent to it. The entire length of flexible segment 41 is located exclusively on upper surface 18 of cable 13.

Rigid segment 33 comprises three components: an elongated rectangular strip 61 on the upper surface 18 of cable 13, and a pair of front and rear, elongated oval tabs 63, 65 on the lower surface 19 of cable 13. Strip 61 and tabs 63, 65 are formed from the same material as rigid segment 31. The rear end of flexible segment 41 is mounted in a rectangular notch 67 on the lower front end of strip 61. Note that the front end of rigid segment 33 is virtually identical to the rear end of rigid segment 31, except that they are oriented in opposite longitudinal directions. Strip 61 has a shallow, rectangular channel 69 which extends along its entire length for receiving cable 13. Front tab 63 has a rectangular channel 71 in its upper surface for accommodating the thickness of cable 13. Rear tab 65 has a consistent thickness and is used to clamp the front end of flexible segment 43 to strip 61 and against cable 13. As described for rigid segment 31, the fasteners 55 used to join strip 61, tabs 63, 65, flexible segment 41, and flexible segment 43 extend through the protruding corners of these components outside of the lateral side edges of cable 13.

Flexible segment 43 is identical to flexible segment 41 except that it is located adjacent to the lower surface 19 of cable 13. The rear end of flexible segment 43 is clamped to the front end of rigid segment 35 (FIG. 2B). As stated previously, rigid segment 35 is identical to rigid segment 33, including a strip 73, and front and rear tabs 75, 77, except that they are oriented in opposite longitudinal directions. Thus, strip 73 has a notch 79 and channel 81 that are identical to those of strip 61, front tab 75 is identical to rear tab 65, and rear tab 77 is identical to front tab 63, including a channel 83.

The rear end of rigid segment 35 is joined to the front end of flexible segment 45. Flexible segment 45 is identical to flexible segment 41 in every way, except that its rear end is clamped to cable 13 with a pair of tabs 91, 93. Tab 91 is identical to tab 63, and tab 93 is identical to tab 65. When apparatus 11 is joined to cable 13, each segment is substantially clamped to the other segments. Cable 13 is allowed to move somewhat within the cavities of rigid segments 33, 35 as the dynamic cable assembly moves between its minimum and maximum radii of curvature.

Figure 3:
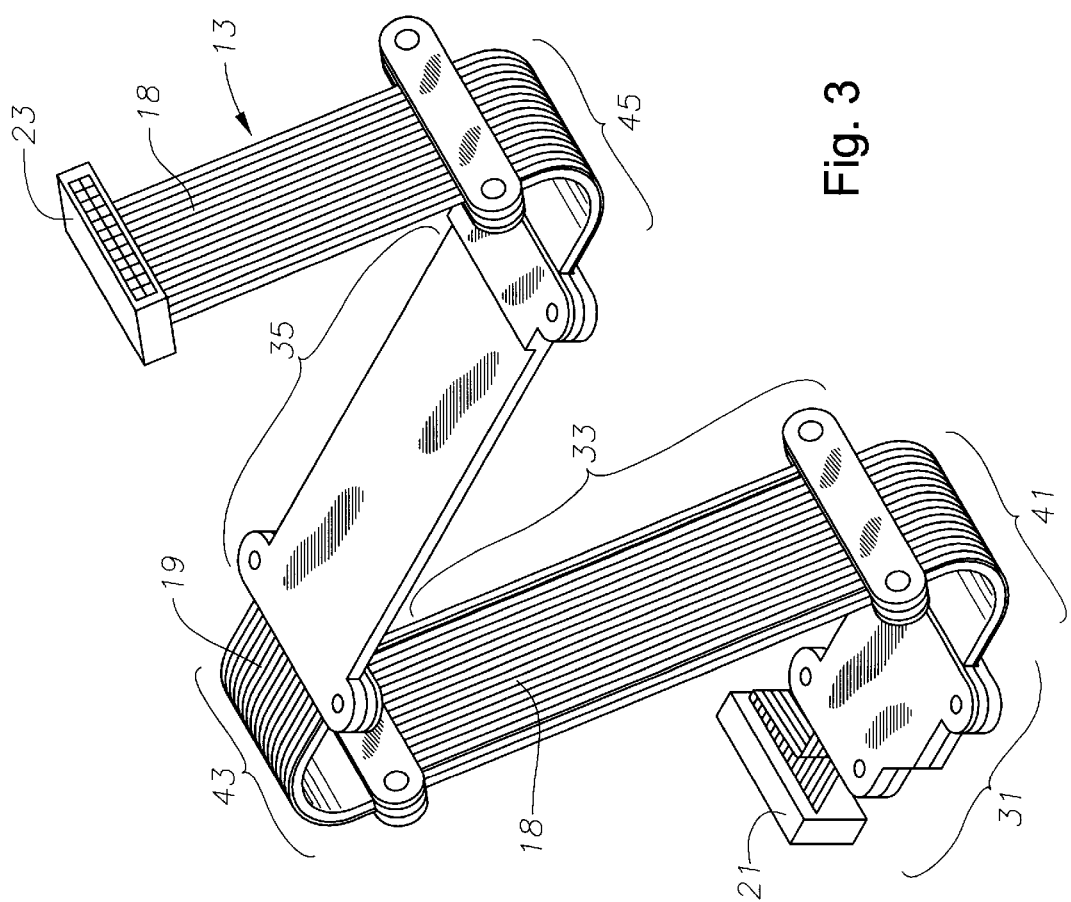
FIG. 3 is an isometric view of the apparatus of FIG. 1 in a partially folded configuration.

In operation (FIGS. 3–5), cable 13 is flexed about its lateral axis 17 at three, predefined hinge regions, flex points or elbows which are longitudinally aligned with flexible segments 41, 43, 45. The flex points do not move and are isolated between the fastened ends of the flexible segments 41, 43, 45. Note that at each flex point, flexible segments 41, 43, 45 lie along the inside radius of flexure. This is an important requirement for extending the flex life of cable 13 and the proper usage of apparatus 11. The outer surfaces of the flex points of cable 13 are exposed and unsupported.

Figure 4:
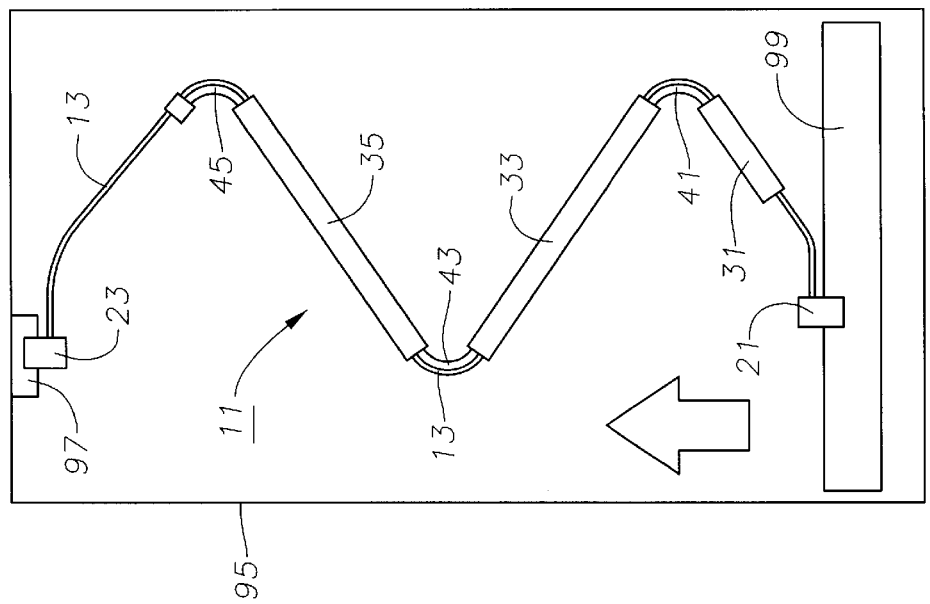
FIG. 4 is a side view of the apparatus of FIG. 1 installed in an application and is shown in an extended position.
Figure 5:
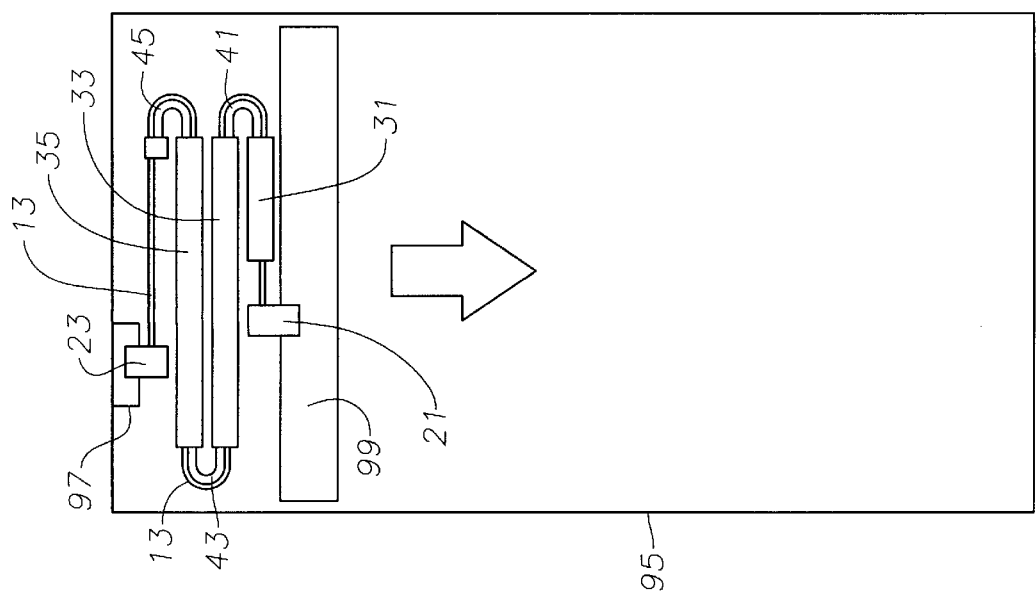
FIG. 5 is a side view of the apparatus and application of FIG. 4 and are shown in a retracted position.

FIGS. 4 and 5, depict the assembly of apparatus 11 and cable 13 being used by the robotic picker 95 of a miniature, automated storage library for data cartridges (not shown). Picker 95 has a stationary portion 97 and a dynamic portion 99 which moves vertically relative to stationary portion 97 between an extended position (FIG. 4) and a retracted position (FIG. 5). In the extended position, the flexible segments 41, 43, 45 are spread apart to their maximum bend radii and rigid segments 31, 33, 35 are staggered diagonally relative to one another. In the retracted position, flexible segments 41, 43, 45 are collapsed to their minimum bend radii and rigid segments 31, 33, 35 are stacked substantially flat adjacent to one another. As dynamic portion 99 of picker 95 moves to select various data cartridges, cable 13 will be repeatedly flexed about its flex points. However, with apparatus 11, the bend radii of cable 13 at the flex points are larger than they would normally be at all times due to the presence of flexible segments 41, 43, 45 along the inner surfaces of the flex points of cable 13. The positioning of flexible segments 41, 43, 45 on the inner radii of flexure ensures that the bending stresses exerted on electrical conductors of cable 13 will be minimized. Thus, apparatus 11 prevents cable 13 from being creased or failing because of premature fatigue.

Figure 6:
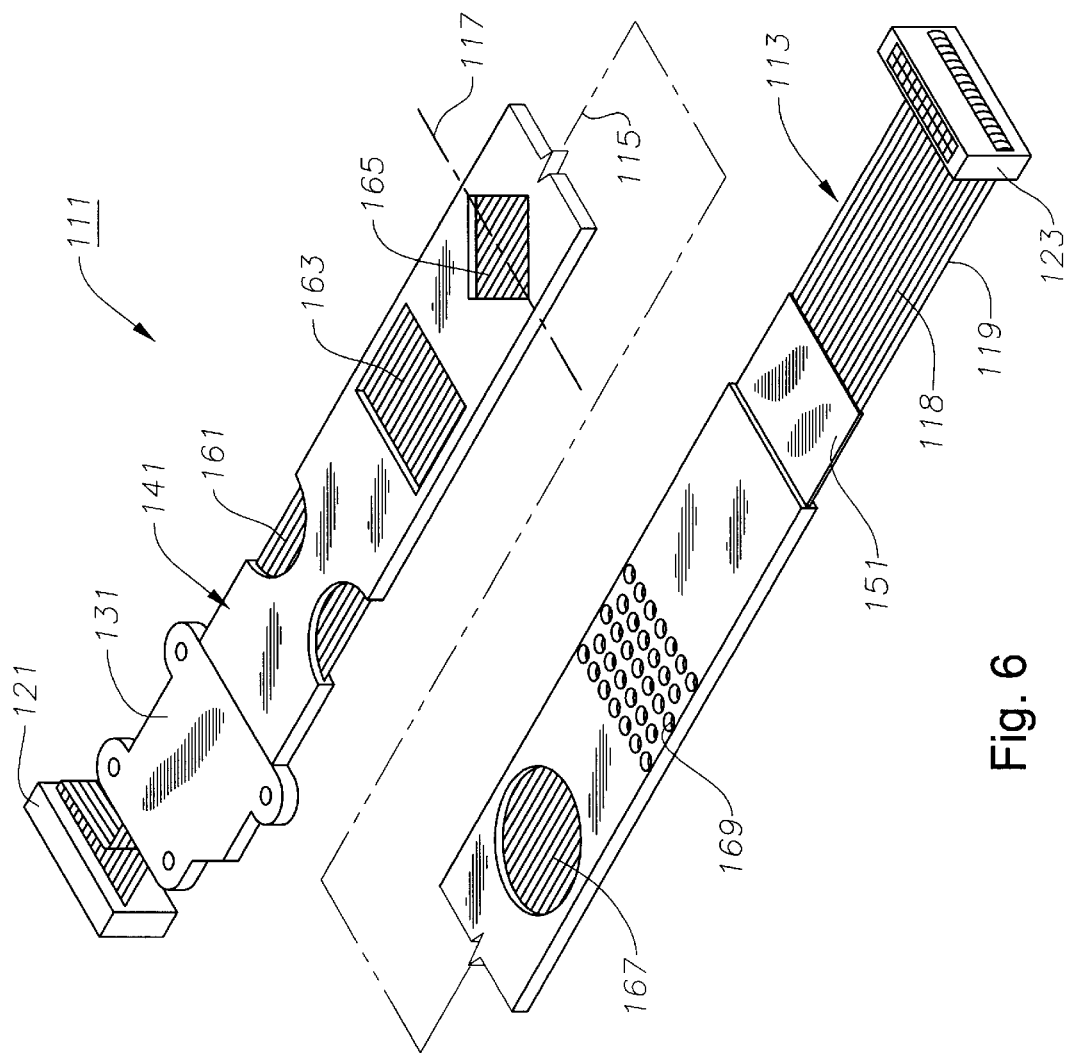
FIG. 6 is an isometric view of a second embodiment of the apparatus of FIG. 1.

Referring now to FIG. 6, a second embodiment of the invention is shown as apparatus 111. Like apparatus 11, apparatus 111 is provided for supporting and reinforcing a flexible cable 113 is shown. Cable 113 is identical to cable 13, including a longitudinal axis 115, a lateral axis 117, upper and lower surfaces 118, 119, and a pair of connectors 121, 123.

Apparatus 111 comprises a rigid segment 131 and a flexible segment 141 that are fastened together to form a continuous support unit along most of the length of cable 113. Rigid segment 131 is identical to rigid segment 31, described above, and conforms to cable 113 in the same way that segment 31 conformed to cable 13. Flexible segment 141 is formed from an elongated, flat rectangular jacket or sleeve of elastomeric material such as silicone rubber. Segment 141 closely receives but is loosely fitted around cable 113 to allow a limited range of movement and flexibility therebetween. The front and rear ends of segments 141, 131, respectively, are joined together by fasteners in the same way that segments 41, 31 are joined. The rear end of segment 141 is not attached to cable 113, but is limited from sliding rearward relative thereto by an abutting fixed sleeve 151. Sleeve 151 is preferably heatshrink tubing or other material which can be secured to cable 113.

In FIG. 6, flexible segment 141 is shown with a plurality of uniquely configured formations which align with the predefined flex points in cable 113. The formations are substantially a patterned hole or holes punched in segment 141 and may be located in only one side or in both sides of segment 141, depending on the specific characteristics of flexibility needed. The formations include semi-circles 161, square 163, diamond 165, circle 167, and perforations 169, but other shapes also may be utilized. Moreover, the shapes of the formations may be mixed or matched on opposite sides of segment 141. Although segment 141 is shown with five formations, it would typically have fewer formations which are equal in number to the number of predefined flex points in cable 113.

In operation, cable 113 is flexed at its predefined hinge regions or flex points which are located at the formations 161–169, much like cable 13 in FIGS. 4 and 5. The flex points do not move and are isolated at the formations. However, unlike apparatus 11, apparatus 111 surrounds both surfaces 118, 119 of cable 113 and, thus, both the inner and outer radii of flexure. When apparatus 111 and cable 113 are in an extended position (not shown, but like FIG. 4), flexible segment 141 unfolds to its maximum bend radii. In a retracted position (like FIG. 5), flexible segment 141 is collapsed to its minimum bend radii and stacked substantially flat. Although cable 113 is repeatedly flexed about its flex points, apparatus 111 maintains the bend radii of cable 113 at the flex points at a larger radius than they would normally be at all times due to the presence of flexible segment 141 along the inner surfaces of cable 113. The positioning of flexible segment 141 on the inner radii of flexure ensures that the bending stresses exerted on electrical conductors of cable 113 will be minimized. Thus, like apparatus 11, apparatus 111 prevents cable 113 from being creased or failing because of premature fatigue.

The invention has several advantages. The apparatus isolates and reinforces the predefined hinge regions of a flexible cable such as a flat ribbon cable. The invention extends the flex life of the cable while minimizing the bend radii of the hinge regions. The first embodiment of the apparatus also stiffens the non-hinge regions of the cable. The formations in the second embodiment allow the flexible segments to be custom tailored to any desired flexible characteristics.

While the invention has been shown or described in only some of its forms, it should be apparent to those skilled in the art that it is not so limited, but is susceptible to various changes without departing from the scope of the invention.

We claim:

1. An apparatus, comprising:
   a flexible cable having a longitudinal axis, a lateral axis which is transverse to the longitudinal axis, a plurality of electrical conductors which extend longitudinally along a length of the cable, and a connector on each end;
   at least one elbow in the cable about which the cable bends, said at least one elbow being at a location that is longitudinally fixed between the ends of the cable and having a radius of curvature;
   a support member attached to and extending along a portion of the length of the cable, the support member having at least one flexible segment which longitudinally aligns with and engages said at least one elbow; and wherein
   when the cable is flexed about said at least one elbow, said at least one flexible segment of the support member supports said at least one elbow.

2. The apparatus of claim 1 wherein said at least one flexible segment of the support member limits the minimum radius of curvature of said at least one elbow.

3. The apparatus of claim 1 wherein said at least one flexible segment of the support member engages an inner surface of said at least one elbow.

4. The apparatus of claim 1 wherein said at least one elbow comprises a plurality of elbows, each of which is longitudinally fixed between the ends of the cable, and wherein said at least one flexible segment comprises a plurality of flexible segments, each of which longitudinally aligns with one of the elbows.

5. The apparatus of claim 1 wherein said at least one elbow is flexible about the lateral axis.

6. The apparatus of claim 1 wherein the cable comprises a flat ribbon cable.

7. The apparatus of claim 1 wherein said at least one flexible segment of the support member has an irregularity formed at said at least one elbow, wherein said at least one flexible segment has a different cross-section at the irregularity than at other portions to change the bending characteristics of said at least one flexible segment.

8. The apparatus of claim 1, further comprising an aperture in said at least one flexible segment at said at least one elbow.

9. An apparatus, comprising:
   a flexible cable having a longitudinal axis, a lateral axis which is transverse to the longitudinal axis, a plurality of electrical conductors which extend longitudinally along a length of the cable, a connector on each end;
   an elbow in the cable about which the cable bends, the elbow being fixed at a location between the ends of the cable and having a radius of curvature;
   a support member attached to and extending along a portion of the length of the cable, the support member having a flexible segment which longitudinally aligns with and engages the elbow; wherein
   when the cable is flexed about the elbow, the flexible segment of the support member supports the elbow; and wherein
   the support member has a rigid segment attached to the flexible segment and the cable for preventing bending of the cable adjacent to the elbow.

10. The apparatus of claim 9 wherein said rigid segment comprises an elongated strip and a retainer located opposite the strip that clamps the strip to the cable.

11. An apparatus, comprising:
   a flexible cable having a longitudinal axis a lateral axis which is transverse to the longitudinal axis, a plurality of electrical conductors which extend longitudinally along a length of the cable, a connector on each end;
   an elbow in the cable about which the cable bends, the elbow being fixed at a location between the ends of the cable and having a radius of curvature;
   a support member attached to and extending along a portion of the length of the cable, the support member having a flexible segment which longitudinally aligns with and engages the elbow; wherein
   when the cable is flexed about the elbow, the flexible segment of the support member supports the elbow; and wherein the support element has a rigid segment attached to and extending from each longitudinal end of the flexible segment, each of the rigid segments preventing bending of the cable adjacent to both longitudinal sides of the elbow.

12. An apparatus, comprising in combination:
a mechanized device having a stationary element and a dynamic element that moves relative to the stationary element;
a flexible cable having a length, a first end connected to the stationary element, and a second end connected to the dynamic element;
at least one elbow in the cable about which the cable bends, said at least one elbow being at a location that is fixed between the ends of the cable and having a radius of curvature;
a support member mounted to the cable and having at least one flexible segment which aligns with and engages said at least one elbow along the length of the cable; and wherein
when the cable is flexed about said at least one elbow, said at least one flexible segment of the support member supports said at least one elbow.

13. The apparatus of claim 12 wherein said at least one flexible segment of the support member limits the minimum radius of curvature of said at least one elbow.

14. The apparatus of claim 12 wherein said at least one flexible segment of the support member engages an inner surface of said at least one elbow.

15. The apparatus of claim 12 wherein said at least one elbow comprises a plurality of elbows, each of which is fixed between the ends of the cable, and wherein said at least one flexible segment comprises a plurality of flexible segments, each of which aligns with one of the elbows.

16. The apparatus of claim 12 wherein the cable comprises a flat ribbon cable.

17. The apparatus of claim 12 wherein said at least one flexible segment of the support member has an irregularity formed at said at least one elbow to give said at least one flexible segment a different cross-section at the irregularity than at its other portions, the irregularity thereby changing the bending characteristics of said at least one flexible segment.

18. The apparatus of claim 12, further comprising an aperture in said at least one flexible segment at said at least one elbow.

19. An apparatus, comprising in combination:
a mechanized device having a stationary element and a dynamic element that moves relative to the stationary element;
a flexible cable having a length, a first end connected to the stationary element, and a second end connected to the dynamic element;
an elbow in the cable about which the cable bends, the elbow being fixed at a location between the ends of the cable and having a radius of curvature;
a support member mounted to the cable and having a flexible segment which aligns with and engages the elbow along the length of the cable; wherein
when the cable is flexed about the elbow the flexible segment of the support member supports the elbow; and wherein
the support member has a rigid segment attached to the flexible segment and the cable for preventing bending of the cable adjacent to the elbow.

20. The apparatus of claim 19 wherein the rigid segment comprises an elongated strip and a retainer located opposite the strip that clamps the strip to the cable.

21. An exoskeleton for a flat ribbon cable having a longitudinal axis, a lateral axis which is transverse to the longitudinal axis, a plurality of electrical conductors which extend longitudinally along a length of the cable, a connector on each end, and an elbow in the cable about which the cable bends, the elbow being fixed at a location between the ends of the cable and having a radius of curvature, comprising:
a flexible segment adapted to be mounted to the cable and longitudinally aligned with the elbow to engage an inner surface of the elbow;
a rigid segment secured to the flexible segment and adapted to be mounted to the cable; and wherein
when the cable is flexed about the elbow, the flexible segment of the support member supports the elbow to limit its minimum radius of curvature, and the rigid segment prevents bending of the cable adjacent to the elbow.

22. The exoskeleton of claim 21 wherein the rigid segment comprises an elongated strip and a retainer located opposite the strip that is adapted to clamp the strip to the cable.

23. The exoskeleton of claim 21 wherein the flexible segment has an irregularity formed at the elbow to give the flexible segment a different cross-section at the irregularity than at its other portions, the irregularity changing the bending characteristics of the flexible segment.

24. The exoskeleton of claim 21 wherein the flexible segment has a longitudinal passage through which the cable extends.

25. The exoskeleton of claim 21 wherein the flexible segment has first and second sides, each with an aperture formed therein.

26. The exoskeleton of claim 21, further comprising an aperture in the flexible segment at the elbow.

27. The exoskeleton of claim 26 wherein the aperture is arcuate in shape.

28. The exoskeleton of claim 26 wherein the aperture is rectangular in shape.

29. The exoskeleton of claim 26 wherein the aperture comprises perforations.

* * * * *